(12) United States Patent
Handke

(10) Patent No.: US 6,382,648 B1
(45) Date of Patent: May 7, 2002

(54) SPRING-PLATE SUPPORT WITH NOISE REDUCTION

(75) Inventor: Günther Handke, Euerbach (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/505,099

(22) Filed: Feb. 16, 2000

(30) Foreign Application Priority Data

Feb. 23, 1999 (DE) .......................................... 199 07 696

(51) Int. Cl.⁷ ................................................ B60G 3/02
(52) U.S. Cl. ...................... 280/124.151; 280/124.147; 267/170
(58) Field of Search ................................ 267/179, 170, 267/286, 220, 221; 280/124.147, 124.151

(56) References Cited

U.S. PATENT DOCUMENTS

| 2,731,257 | A | * | 1/1956 | Hansen ........................ 267/220 |
| 3,051,469 | A | * | 8/1962 | Boschi ........................ 267/220 |
| 4,351,521 | A | * | 9/1982 | Erdos .......................... 272/52 |
| 4,562,997 | A | * | 1/1986 | Iwata et al. .................. 267/8 R |
| 4,690,428 | A | * | 9/1987 | Fluegge ...................... 280/697 |
| 4,810,003 | A | * | 3/1989 | Pinch et al. ................. 280/668 |
| 4,822,072 | A | | 4/1989 | Preslicka et al. |
| 4,958,849 | A | * | 9/1990 | Pinch et al. ................. 280/668 |
| 4,995,737 | A | | 2/1991 | Moller et al. |
| 5,133,573 | A | * | 7/1992 | Kijima et al. ............... 280/697 |
| 5,248,134 | A | * | 9/1993 | Ferguson .................... 267/220 |
| 5,249,781 | A | * | 10/1993 | Wohler ........................ 267/33 |
| 5,261,650 | A | * | 11/1993 | Hein ............................ 267/220 |
| 5,421,565 | A | * | 6/1995 | Harkrader et al. .......... 267/220 |
| 5,454,585 | A | * | 10/1995 | Dronen et al. .............. 280/660 |
| 5,676,355 | A | * | 10/1997 | Hayashi et al. ............. 267/221 |
| 5,975,505 | A | * | 11/1999 | Yoshimoto et al. ........... 267/33 |
| 6,149,171 | A | * | 11/2000 | Bono et al. ........... 280/124.179 |
| 6,155,544 | A | * | 12/2000 | Solomond et al. .......... 267/220 |
| 6,179,309 | B1 | * | 1/2001 | Satou et al. .......... 280/124.155 |
| 6,186,486 | B1 | * | 2/2001 | Gutman et al. ............. 267/220 |

FOREIGN PATENT DOCUMENTS

| DE | 26 00 408 | 1/1977 |
| DE | 40 07 488 | 9/1991 |
| DE | 196 09 250 | 9/1997 |
| DE | 196 32 184 | 2/1998 |
| EP | 733 824 | 9/1996 |
| EP | 778 166 A2 | 6/1997 |
| FR | 2 637 338 | 4/1990 |

* cited by examiner

Primary Examiner—Christopher P. Schwartz
Assistant Examiner—Benjamin A Pezzlo
(74) Attorney, Agent, or Firm—Cohen, Pontani, Lieberman & Pavane

(57) ABSTRACT

The invention relates to spring strut with a flexible pad between a coil spring and a spring-plate which is firmly connected to a cylindrical container of an oscillation damper. The flexible pad, which is used, in particular, for noise damping, is formed by a component of disk-shaped design which is flat on both sides, is composed of rubber, PU or some other plastic, and is connected in a captive and positionally correct manner to the spring-plate. For this purpose, at least one inward-pointing projection and/or at least one aperture is arranged on the flexible pad, interacting with a corresponding aperture and/or projection of the spring-plate. The flexible pad is adapted to the surface of the spring receptacle of the spring-plate by the prestressed coil spring.

5 Claims, 4 Drawing Sheets

SPRING-PLATE SUPPORT WITH NOISE REDUCTION

BACKGROUND OF THE INVENTION

1. Field of the Invention

The invention relates to a spring strut for vehicles, and more particularly to a spring strut having noise reduction.

2. Discussion of the Prior Art

Such noise-reducing supports between the coil spring and the spring-plate are known from European reference EP 0 733 824 A1 and German reference DE 40 07 488 A1. These flexible pads are produced as three-dimensionally twisted moldings and are expensive due to the involved production process. Positionally correct mounting of the flexible pad is likewise not assured because of the absence of precise position marking, which means that the flexible pad has to be made considerably larger and, accordingly, with a higher outlay on materials.

German reference DE 196 32 184 A1 reveals a connection between the flexible pad and the spring-plate. The flexible pad is provided on its outer edge with axially directed spring tongues which allow the pad to be attached to the spring-plate and, in the process, engage behind the spring-plate. In all these embodiments of the flexible pad, a molding of varying axial extent is used and, because of the amount of material required, it is relatively heavy. The molding and the, to some extent, unnecessary volume of material furthermore result in high costs in terms of production and materials.

SUMMARY OF THE INVENTION

Accordingly, it is an object of the present invention to provide a flexible pad which can be produced at reasonable cost and allows positionally correct connection to the spring-plate without any problems.

Pursuant to this object, and others which will become apparent hereafter, one aspect of the present invention resides in the flexible pad being a component of disk-shaped design which is flat on both sides. The pad is connected to the spring-plate by means of form-locking engagement using at least one projection and at least one aperture. The flexible pad is adapted to the surface of the spring receptacle of the spring-plate by the prestressed coil spring. The simple disk-shaped design of the flexible pad allows production at very reasonable cost. Compared with the known flexible pads, for instance, a smaller volume of material is required and, accordingly, high-grade and expensive material is saved. This disk-shaped flexible pad can, for example, be produced by cutting it off a correspondingly designed molding. As an alternative, the flexible pad can be produced from slabs of desired thickness, e.g. by water-jet cutting. By appropriate choice of material and appropriate thickness of material, it is possible to mitigate or eliminate noises stemming from the spring strut, vibration and other unpleasant characteristics. The flexible pad can accordingly be composed of a very wide variety of materials, such as rubber, PU or some other flexible plastic. The avoidance of unnecessary thickening of the material on the flexible pad provides a low-cost component of low weight. In the case of the flexible pad, the projections and/or apertures required for positionally correct assembly are made in the plane of the disk, while the apertures and/or projections on the spring-plate which interact with it do not require any extra expenditure, or at least no significant extra expenditure, during its production as a formed and embossed part.

According to another embodiment of the invention, the flexible pad has a projection which is formed by an inward-pointing tongue which engages in a corresponding aperture in the spring-plate. A form-locking point of connection of this kind can also be formed by arranging in the tongue an aperture which engages in a corresponding projection of the spring-plate.

A further point of connection between the flexible pad and the spring-plate is created by the flexible pad having an aperture which is formed by an elongate hole, the spring-plate projection interacting with the elongate hole so as to simultaneously form an anti-rotation safeguard for the coil spring. By means of the elongate hole, it is possible to compensate for the manufacturing tolerances which arise during the production of the spring-plate, and moreover an undersize of the width of the elongate hole results in an axial retention force between the flexible pad and the spring-plate. This is particularly important when the spring struts are being transported to the vehicle manufacturer with the spring-plate but without the coil spring, ensuring that the flexible pad is held accurately on the spring-plate, even when roughly handled during shipping.

In accordance with the features specified, another advantageous refinement of the subject matter of the invention is obtained if the inward-pointing tongue of the flexible pad is provided with lugs which extend in the plane of the disk and, as the tongue-shaped projection is pulled into the aperture in the spring-plate, come to rest by retention surfaces against the rear side of the spring-plate. This form-locking point of connection is accordingly particularly well secured against release by virtue of the fact that the flexible pad is clipped into the spring-plate. With such a connection, the aperture in the spring-plate can be chosen so that assembly is facilitated by twisting the tongue with the lugs and inserted without any significant expenditure of force. The latching connection is effected by the tongue springing back into the initial position and the retention surfaces of the lugs thus coming to rest against the rear side of the spring-plate.

As a further means for positionally correct assembly of the flexible pad with the spring-plates, the flexible pad is provided with, in one region of the inner circumference, a bearing surface which is arranged so as to rest against the outer surface of the container.

In the region of the spring receptacle, the flexible pad can furthermore be provided with one or more apertures or clearance cuts, which keep free openings in the spring-plate or channels between the spring-plate and the container, these openings being intended, for example, to allow water to drain off.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
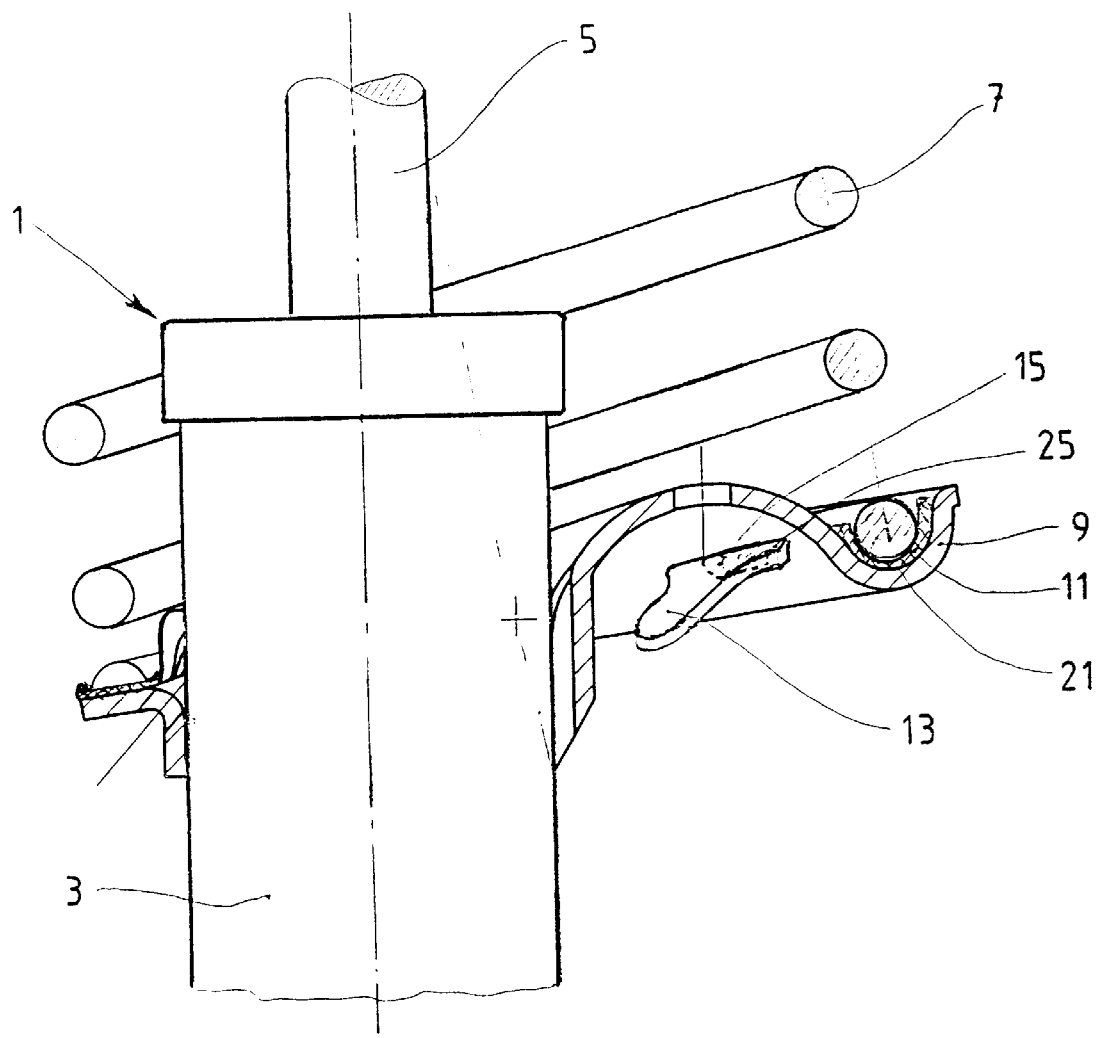
FIG. 1 shows a detail of a spring strut in the region of a spring-plate arranged together with a container of an oscillation damper.

The spring-strut construction shown in FIG. 1 comprises an oscillation damper 1, which has a cylindrical container 3 with a piston rod 5 guided therein. A spring-plate 9 is firmly connected to the container 3 and serves as an abutment for a coil spring 7 acting as a supporting spring. The spring-plate 9 is provided with a spring receptacle 21 which is matched to the shape of the final turn of the coil spring 7, which final turn rests on it. A flexible pad 11 is clamped between the final turn of the coil spring 7 and the spring receptacle 21. To connect the flexible pad 11 to the spring-plate 9, a projection 13, which is formed as a tongue, is pulled through an aperture 15 in the spring-plate 9 and lugs 25 of the projection 13 come to rest against the surface of the spring-plate 9, giving rise to a latching connection. The other end (not shown) of the coil spring 7 acts via a flexible pad on a second spring-plate (likewise not shown), which is usually supported on the vehicle body. The flexible pad 11 is pressed firmly against the spring receptacle 21 by the coil spring 7 and is thereby adapted precisely to its contour and is prestressed by the spring force, as a result of which the original thickness of the flexible pad 11 is reduced and the final turn of the coil spring 7 is well embedded in the spring receptacle 21. The flexible pad 11 accordingly provides a reduction in noise and/or vibration between the coil spring 7 and the spring-plate 9, it being possible to reduce or eliminate certain troublesome characteristics due to the spring strut by selecting a suitable material for the flexible pad 11.

Figure 2:
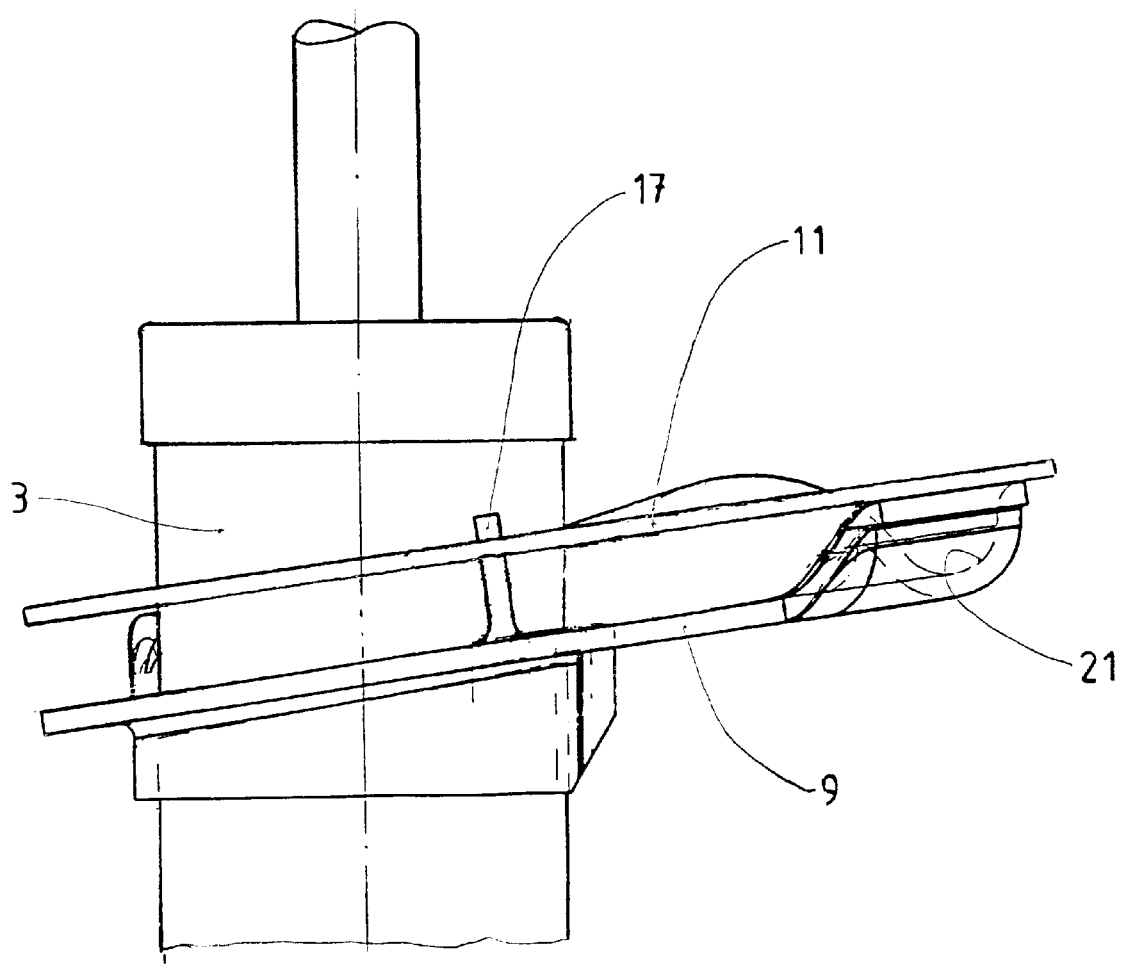
FIG. 2 shows the spring-plate in accordance with FIG. 1 with the flexible pad but without the coil spring.

FIG. 2 shows the condition in which the spring strut is delivered to the vehicle manufacturer. The connection between the spring-plate 9 and the flexible pad 11 is clearly visible here. FIG. 2 likewise clearly shows that this flexible pad 11 is designed as a disk-shaped component which is flat on both sides and does not rest in the base of the spring receptacle 21 without the action of the force of the coil spring 7. The requirement that the flexible pad 11 should be secured in a positionally correct and captive manner on the spring strut until it is assembled with the coil spring is met by the formation of points of connection between the spring-plate 9 and the flexible pad 11. For this purpose, the spring-plate 9 is provided with a projection 17, which is produced as a formed and embossed part of the spring-plate 9 and projects into an aperture in the flexible pad 11. The projection 17 also serves as a stop for the end of the coil spring 7 and thus forms its anti-rotation safeguard. An inward-pointing projection of the flexible pad 11 furthermore projects into an aperture in the spring-plate 9 and, on the left-hand side, the flexible pad rests by a corresponding inner contour against the container 3.

Figure 3:
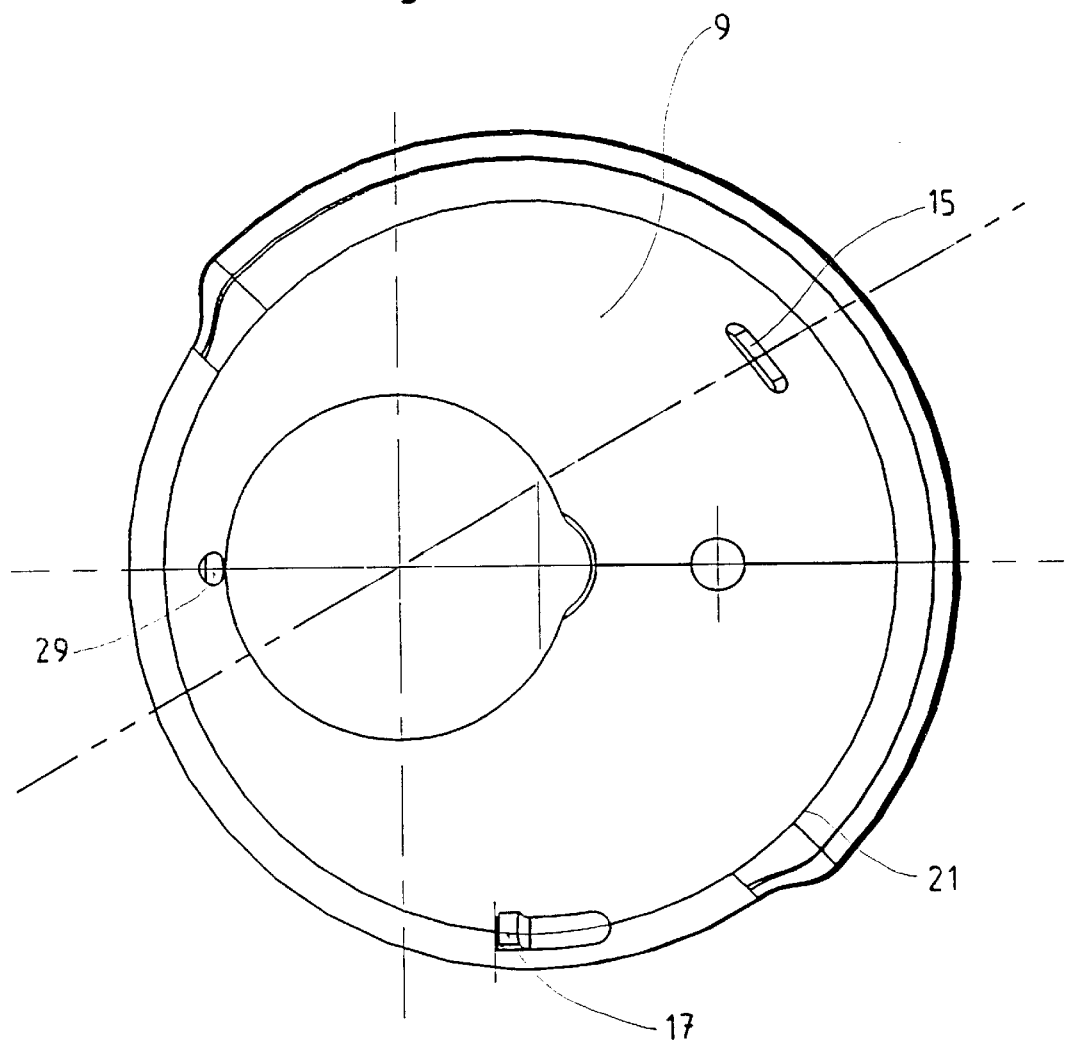
FIG. 3 shows the spring-plate according to FIGS. 1 and 2 in plan view.

FIG. 3 shows the spring-plate 9 as a separate part in plan view, the spring receptacle 21 and the bent-up projection 17 being clearly visible. The aperture 15 is used to form a fastening point, for which purpose an inward-pointing projection of the flexible pad is pulled into this aperture 15. A water drain hole 29 is furthermore provided, and this must be kept free.

Figure 4:
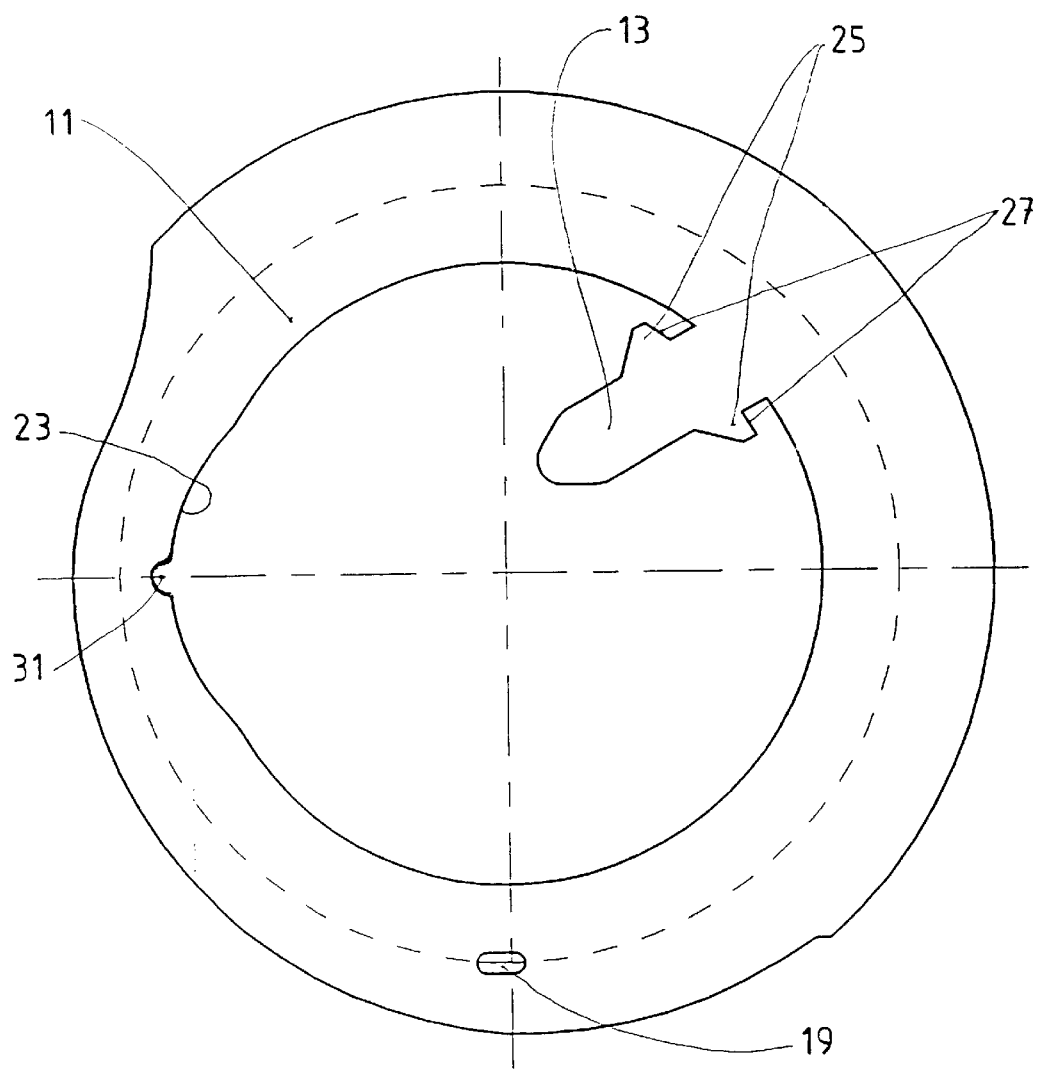
FIG. 4 shows in plan view the flexible pad shown in FIGS. 1 and 2.

FIG. 4 shows the flexible pad 11 of disk-shaped configuration in plan view. To form the points of connection to the spring-plate 9, an inward-pointing projection 13 is arranged, and this is pulled into the aperture 15 (shown in FIG. 3) in the spring-plate 9. A captive connection between the flexible pad 11 and the spring-plate 9 is created by providing the projection 13 with the lugs 25 which have retention surfaces 27. Once the projection 13 is pulled completely into the aperture 15, the retention surfaces 27 come to rest against the rear side of the spring-plate 9 and thus form a latching connection. An aperture 19 designed as an elongate hole interacts with the projection 17 of the spring-plate 9, the slot width of the elongate hole being made smaller than the width of the projection 17 to ensure that the latter is held captive. As an aid to mount the flexible pad 11 in the correct position on the spring strut, the flexible pad is provided in one region of its inner circumference with a bearing surface 23 which interacts with the outer surface of the container 3. A clearance cut 31 is also provided to ensure that the flexible pad 11 does not seal off a water drain hole situated underneath it.

The simple flexible pad 11 shown can be adapted easily as regards selection of material and thickness to the requirements set. The illustrated points of connection between the flexible pad 11 and the spring-plate 9 of the spring strut can also be modified in a simple manner. At its upper end, the projection 17 can, for instance, have a thickened portion by means of which the aperture 19 in the flexible pad 11 is guided, thus giving rise to a latching connection here too. As a further refinement, the projection 13 can, for example, be provided with an aperture which latches into a projection of the spring-plate.

The invention is not limited by the embodiments described above which are presented as examples only but can be modified in various ways within the scope of protection defined by the appended patent claims.

I claim:

1. A spring strut for a vehicle, comprising:
   an oscillation damper with an essentially cylindrical container, and a piston rod guided in the container;
   a spring-plate connected to the container;
   a further spring plate;
   a coil spring which surrounds the container and the piston rod and is held and guided between the spring-plate connected to the container and the further spring-plate, each of the spring-plates having a spring receptacle adapted to a final turn of the coil spring; and
   a flexible pad arranged in the spring receptacle of each spring-plate and connected to the spring-plate so as to be between the final turn and the spring receptacle for noise damping, the flexible pad being a component of disk-shaped design which is flat on both sides and the connection to the spring-plate is effected by a form-locking engagement using at least one projection and at least one aperture, the flexible pad being adapted to a surface of the spring receptacle of the spring-plate by the prestressed coil spring, the flexible pad having a projection formed as an inward-pointing tongue which engages in a corresponding aperture in the spring-plate.

2. A sprint strut as defined in claim 1, wherein the flexible pad has an aperture which engages with a projection on the spring-plate.

3. A spring strut as defined in claim 1, wherein the tongue has lugs which extend in a plane of the disk so that when the tongue is pulled into the aperture in the spring-plate retention surfaces of the lugs rest against a rear side of the spring-plate.

4. A spring strut as defined in claim 2, wherein the aperture in the flexible pad is an elongate hole into which the projection of the spring-plate engages so as to act as a stop for the coil spring.

5. A spring strut as defined in claim 1, wherein the flexible pad has an inner circumference with a bearing surface in one region arranged so as to rest against an outer surface of the container.

* * * * *